(12) United States Patent
Ishizuka et al.

(10) Patent No.: US 9,098,236 B2
(45) Date of Patent: Aug. 4, 2015

(54) ELECTRONIC DEVICE, SCREEN CONTROL METHOD, AND STORAGE MEDIUM STORING SCREEN CONTROL PROGRAM

(75) Inventors: Yuka Ishizuka, Yokohama (JP); Saya Miura, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 248 days.

(21) Appl. No.: 13/455,392

(22) Filed: Apr. 25, 2012

(65) Prior Publication Data

US 2012/0278734 A1 Nov. 1, 2012

(30) Foreign Application Priority Data

Apr. 26, 2011 (JP) ................................ 2011-098655

(51) Int. Cl.
| | |
|---|---|
| G06F 3/0486 | (2013.01) |
| G06F 1/16 | (2006.01) |
| G06F 3/01 | (2006.01) |
| G06F 3/0488 | (2013.01) |
| G06F 17/21 | (2006.01) |
| G06F 17/24 | (2006.01) |
| G06F 3/14 | (2006.01) |

(52) U.S. Cl.
CPC .............. *G06F 1/1624* (2013.01); *G06F 3/017* (2013.01); *G06F 3/0486* (2013.01); *G06F 3/04886* (2013.01); *G06F 17/212* (2013.01); *G06F 17/24* (2013.01); *G06F 3/1423* (2013.01); *G09G 2340/14* (2013.01)

(58) Field of Classification Search
CPC ..... G06F 3/041; G06F 3/0481; G06F 3/0484; G06F 3/0488; G06F 3/017; G06F 3/0483; G06F 3/0486; G06F 3/04886

See application file for complete search history.

(56) References Cited

U.S. PATENT DOCUMENTS

| | | | |
|---|---|---|---|
| 2004/0184664 A1* | 9/2004 | Tuli ............................... | 382/232 |
| 2007/0220425 A1 | 9/2007 | Matulic | |
| 2007/0285401 A1* | 12/2007 | Ohki et al. ..................... | 345/173 |
| 2010/0192108 A1* | 7/2010 | Liu et al. ...................... | 715/863 |

FOREIGN PATENT DOCUMENTS

| | | |
|---|---|---|
| JP | 2007-249429 A | 9/2007 |
| JP | 2009026089 A | 2/2009 |
| JP | 2010-92340 A | 4/2010 |
| WO | 2005114363 A1 | 12/2005 |

OTHER PUBLICATIONS

Patterson, M., "Create stunning HTML email that just works", 2010, Site Point Pty. Ltd., Ch. 1, 4.*
Casciano, C., "The CSS Pocket Guide", 2010, Peachpit Press, Ch. 5, 6, 9.*
Office Action mailed Nov. 4, 2014, corresponding to Japanese patent application No. 2011-098655.

* cited by examiner

*Primary Examiner* — Claudia Dragoescu
(74) *Attorney, Agent, or Firm* — Lowe Hauptman & Ham, LLP (57) ABSTRACT

According to an aspect, an electronic device includes a display unit, a detecting unit, and a control unit, and composes a mail that includes an image and a text. The display unit displays a first screen and a second screen in such a manner that the first screen and the second screen do not overlap each other. The first screen displays an overview of the mail, and the second screen edits an image or a text as an element to be added to the mail. The detecting unit detects an operation. When an operation made on the second screen is detected by the detecting unit, the control unit updates the overview of the mail that is displayed on the first screen in accordance with the operation.

8 Claims, 8 Drawing Sheets

ELECTRONIC DEVICE, SCREEN CONTROL METHOD, AND STORAGE MEDIUM STORING SCREEN CONTROL PROGRAM

CROSS-REFERENCE TO RELATED APPLICATIONS

This application claims priority from Japanese Application No. 2011-098655, filed on Apr. 26, 2011, the content of which is incorporated by reference herein in its entirety.

BACKGROUND

1. Technical Field

The present disclosure relates to an electronic device, a screen control method, and a storage medium storing therein a screen control program.

2. Description of the Related Art

Some electronic devices, such as mobile phones, have an email function. Some electronic devices can compose HTML mails that contain not only character information but also images and animations. For example, a device is described in Japanese Patent Application Laid-open No. 2009-26089 that creates a decoration template and then composes a decoration mail by modifying the decoration template. A device having a touch panel is described in Domestic Republication of PCT International Publication for Patent Applications No. 2005-114363. Although the device is not a mail composing device, the device can edit an image in accordance with an input operation made using the touch panel.

When an image is edited using the device of Japanese Patent Application Laid-open No. 2009-26089 and the device of Domestic Republication of PCT International Publication for Patent Applications No. 2005-114363, because a screen is displayed on a display unit for editing characters and images of the mail, when the user views an overview of the composed HTML mail, he/she needs to temporarily stop editing. Thus, the user needs to temporarily stop the editing operation each time he/she checks the overview, which annoys the user. Moreover, because the user cannot edit a mail while viewing the overview of the mail, it is difficult to edit the mail while grasping an overview of the contents.

For the foregoing reasons, there is a need for an electronic device, a screen control method, and a screen control program that allow the user to compose a mail while grasping an overview of the contents of the composed mail.

SUMMARY

According to an aspect, an electronic device includes a display unit, a detecting unit, and a control unit, and composes a mail that includes an image and a text. The display unit displays a first screen and a second screen in such a manner that the first screen and the second screen do not overlap each other. The first screen displays an overview of the mail, and the second screen edits an image or a text as an element to be added to the mail. The detecting unit detects an operation. When an operation made on the second screen is detected by the detecting unit, the control unit updates the overview of the mail that is displayed on the first screen in accordance with the operation.

According to another aspect, a screen control method is executed by an electronic device for composing a mail that includes an image and a text. The screen control method includes: displaying a first screen for displaying an overview of the mail; displaying a second screen for editing an image or a text as an element to be added to the mail, in such a manner that the first screen and the second screen do not overlap each other; detecting an operation made on the second screen by a detecting unit; and updating the overview of the mail that is displayed on the first screen in accordance with the operation.

According to another aspect, a non-transitory storage medium stores therein a screen control program. When executed by an electronic device for composing a mail that includes an image and a text, the screen control program causes the electronic device to execute: displaying a first screen for displaying an overview of the mail; displaying a second screen for editing an image or a text as an element to be added to the mail, in such a manner that the first screen and the second screen do not overlap each other; detecting an operation made on the second screen by a detecting unit; and updating the overview of the mail that is displayed on the first screen in accordance with the operation.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the electronic device; however, the present invention is not limited to mobile phones. Therefore, the present invention can be applied to any type of devices provided with a mail composition function, including but not limited to personal handyphone systems (PHS), personal digital assistants (PDA), portable navigation units, personal computers (including but not limited to tablet computers, netbooks etc.), media players, portable electronic reading devices, and gaming devices. The present invention can also be applied to stationary electronic devices that have a plurality of display units.

First of all, an overall configuration of a mobile phone 1 will be explained with reference to FIGS. 1 and 2. The mobile phone 1 is an embodiment of an electronic device.

Figure 1:
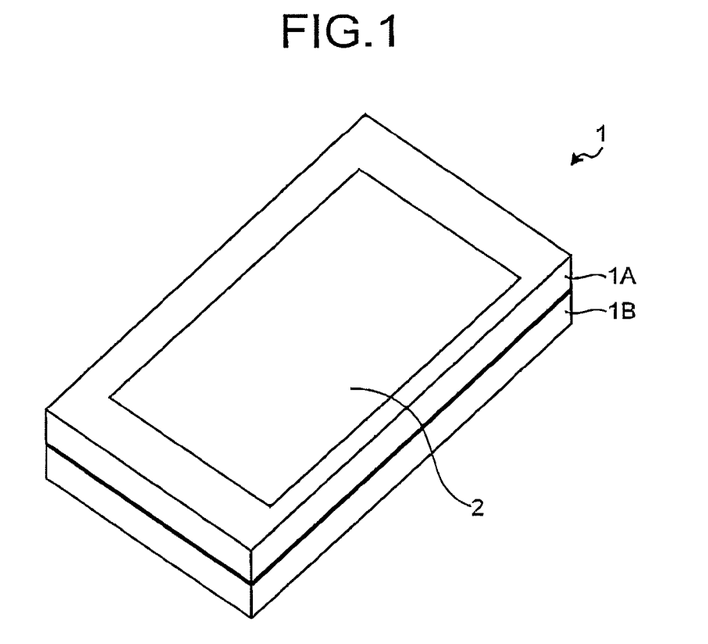
FIG. 1 is a perspective view of a mobile phone in a first form.
Figure 2:
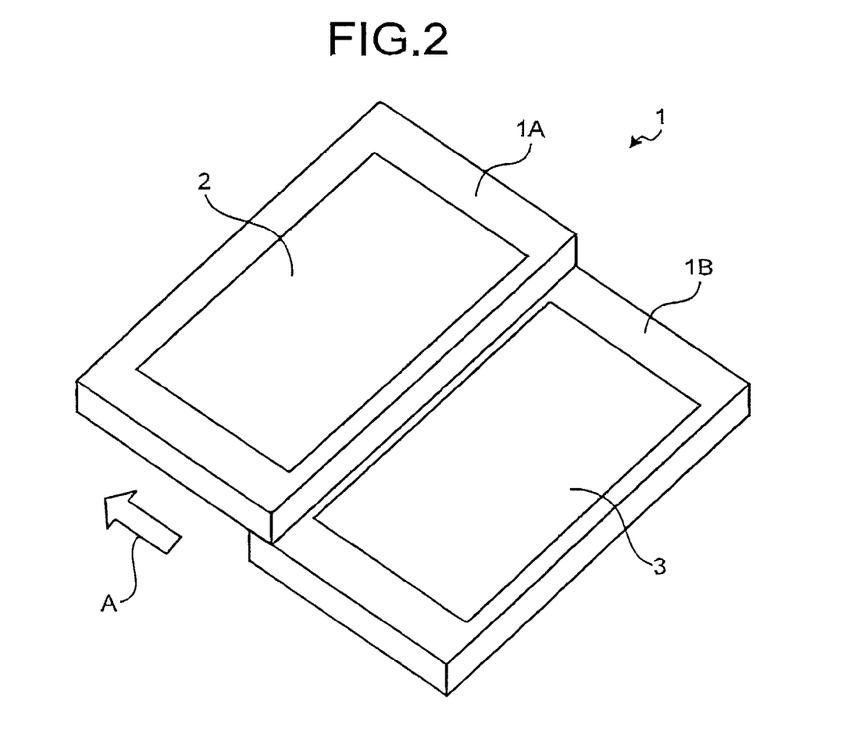
FIG. 2 is a perspective view of the mobile phone in a second form.

FIG. 1 is a perspective view of the mobile phone 1 in a first form; FIG. 2 is a perspective view of the mobile phone 1 in a second form. The mobile phone 1 includes a first housing 1A and a second housing 1B. The first housing 1A is configured possible to slide in a direction indicated by an arrow A with respect to the second housing 1B.

The first housing 1A includes a first touch panel 2 on a surface opposite to a surface that is facing the second housing 1B. The second housing 1B includes a second touch panel 3 on a surface that is facing the first housing 1A. Each of the first touch panel 2 and the second touch panel 3 displays characters, figures, images, etc., thereon and detects various operations made thereon with a user's finger(s), a stylus, etc., (in the description herein below, for the sake of simplicity, it is assumed that the user touches the touch panel 2 and the touch panel 3 with his/her finger(s)). In the first form in which the first housing 1A overlaps with the second housing 1B, the second touch panel 3 is covered and hidden behind the first housing 1A. In the second form in which the first housing 1A is slit in a direction indicated by the arrow A, the second touch panel 3 appears outside.

The first form is called as "closed state". The first form is appropriate when the user carries the mobile phone 1 around. Even in the first form, the user can check information displayed on the first touch panel 2 and can input information by manipulating the first touch panel 2 with his/her finger. The second form is called as "open state". The second form is appropriate when the user uses the mobile phone 1. The user can check more information by using both the first touch panel 2 and the second touch panel 3.

Figure 3:
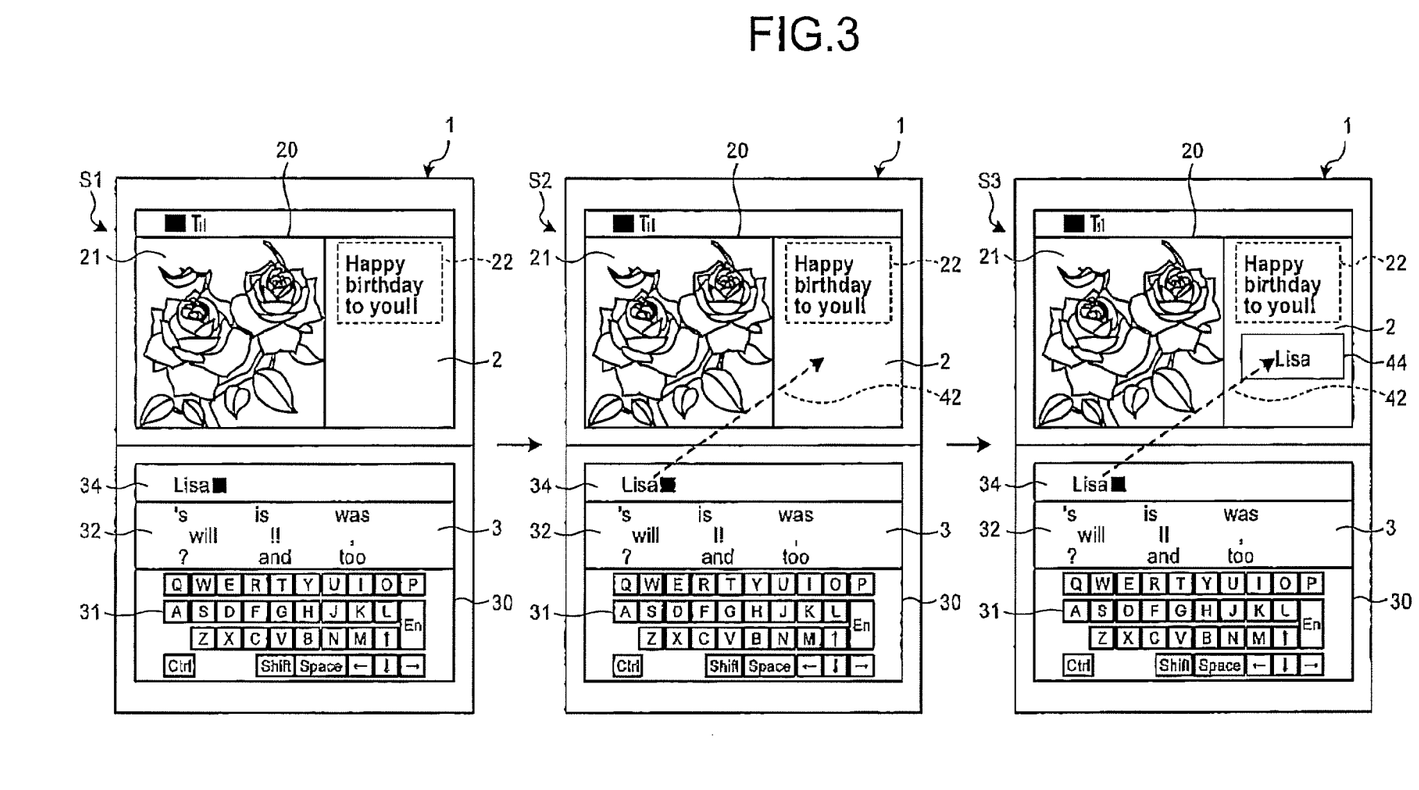
FIG. 3 is a diagram that explains mail composing operations.
Figure 4:
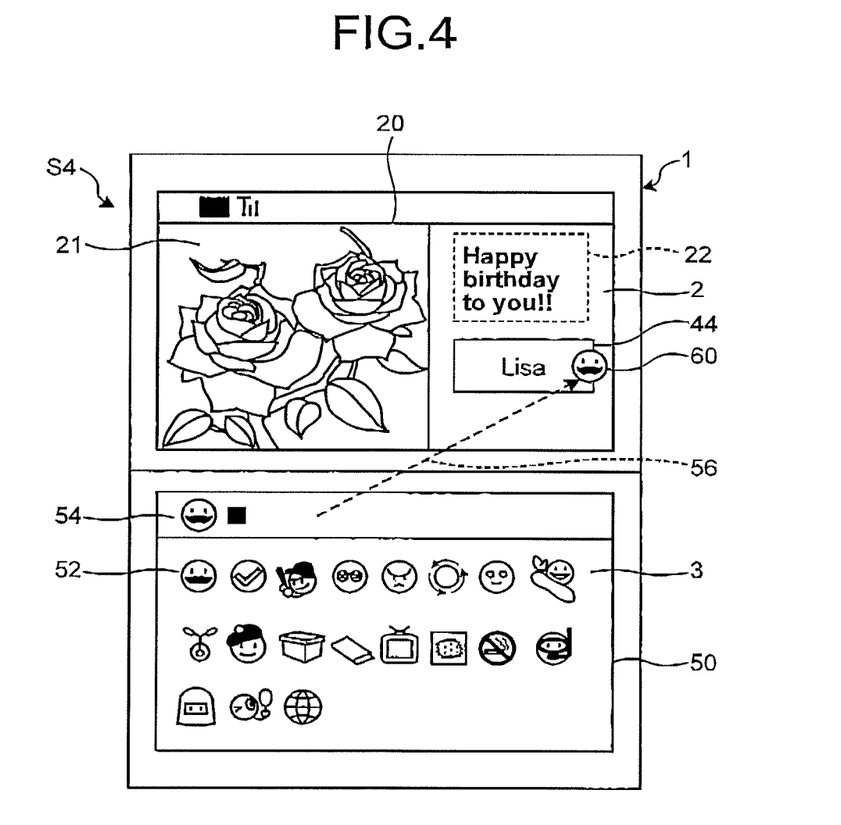
FIG. 4 is a diagram that explains mail composing operations.

Screen displaying by the mobile phone 1 for mail composition will be explained with reference to FIGS. 3 and 4. FIGS. 3 and 4 are schematic diagrams that explain mail composing operations. The mail illustrated in FIGS. 3 and 4 is an HTML mail that includes an image and a text (character information). More particularly, the mail is a decoration mail that includes a text decorated with either or both of an image and an animation.

As illustrated in FIG. 3, at Step S1, the mobile phone 1 is in the second state and both the first touch panel 2 and the second touch panel 3 appear outside. The mobile phone 1 displays a layout screen 20 on the first touch panel 2 and a text editor 30 on the second touch panel 3 at Step S1. The layout screen 20 is a screen on which the overview of a composed mail is displayed. The layout screen 20 includes an image 21 and a text 22. The image 21 and the text 22 are elements, and the display position and the content thereof are set in accordance with operations by the user. Although, in the present embodiment, the image 21 and the text 22 are elements that are input by the user, the user can select an initially set template that includes predetermined elements at the start of mail composition. When a template is used, predetermined elements are present even at the start of the composition.

The text editor 30 is a screen for editing characters of a mail. The text editor 30 includes a virtual keyboard 31, a predictive text display area 32, and an input character display area 34. The virtual keyboard 31 is an image that includes alphabets and various function keys. When the virtual keyboard 31 is displayed on the second touch panel 3, the mobile phone 1 detects various input actions made on the second touch panel 3 with a finger, detects which key of the virtual keyboard 31 is pressed or touched, and sets the pressed or touched key to be an input key, thereby performing character entry. The second touch panel 3 detects not only characters input operation but also various input operations made on the second touch panel 3 with an image currently being displayed and a finger, and then performs various control based on the input operation. The predictive text display area 32 is a region in which predictions are displayed. The predictions are extracted depending on character(s) that is input with the virtual keyboard 31. The mobile phone 1 can be configured to display, as predictions, character(s) that is input but not yet entered (fixed), words that are created by adding predictive character(s) to character(s) that is input but not yet entered, or predictive character(s) possible to follow an entered character. The input character display area 34 is a region in which both character(s) that is input and then entered and character(s) that is input but not yet entered are displayed as a character string.

As the mobile phone 1 of Step S2 indicates, the user makes an operation with a moving action in a direction toward the first touch panel 2 (i.e., an operation in a direction indicated by an arrow 42) in the input character display area 34. Example of an operation with a moving action includes a flick operation, a drag operation, and a sweep operation. A flick operation is an operation in which the user touches a touch panel with a finger and then moves the finger quickly as if flicking something. A drag operation is an operation in which the user selects a certain object by touching a touch panel with a finger and then specifies the position to which the object is moved. A sweep operation is an operation in which the user touches a touch panel with a finger and then moves the finger while maintaining the finger in contact with the touch panel. An operation with a moving action is detected by the second touch panel 3 as an action that begins with a contact at a certain position on the second touch panel 3 and follows a movement of the contact position while maintaining the finger in contact with the second touch panel 3.

As described above, when an operation with a moving action is performed in the input character display area 34 is made and the display unit that displays layout screen 20 including the overview or the mail (the first touch panel 2) is present in the moving direction, as Step S3 indicates, the mobile phone 1 performs a process of displaying a character string that is appearing on the input character display area 34 on the layout screen 20 of the first touch panel 2, and then displays a text 44, which is formed with the character string appearing on the input character display area 34, on the layout screen 20 of the first touch panel 2. The text 44 can be displayed with a frame surrounding its display area. It is possible to display the frame only when the area is selected.

Moreover, as the mobile phone 1 of Step S4 in FIG. 4 indicates, the user can add an image 60 to the layout screen 20. At Step S4, the mobile phone 1 displays the layout screen 20 on the first touch panel 2 and displays an image editor 50 on the second touch panel 3. The image editor 50 includes an available image display area 52 and an input image display area 54. The available image display area 52 includes a group of images that are prestored in the mobile phone 1 or acquired from an external device. The group of images displayed on the available image display area 52 is images possible to add to a mail. The images include not only still images but also animation images (moving images). The input image display area 54 is a region in which an image is displayed that is selected from the available image display area 52 and input by a user's operation. At Step S4, one image is input to the input image display area 54.

As the mobile phone 1 of Step S4 indicates, the user makes an operation with a moving action in a direction toward the first touch panel 2 (i.e., an operation in a direction indicated by an arrow 56) in the input image display area 54. As described above, when an operation with a moving action is performed in the input image display area 54 and the display unit that displays the layout screen 20 including the overview of the mail (the first touch panel 2) is present in the moving direction, as Step S4 indicates, the mobile phone 1 performs a process of displaying an image that is appearing on the input image display area 54 on the layout screen 20 of the first touch panel 2, and displays the image 60, which is appearing on the input image display area 54, on the layout screen 20 of the first touch panel 2. Therefore, the layout screen 20 becomes, at Step S4, an image that includes the image 21, the text 22, the text 44, and the image 60. The text 44 is added to the layout screen 20 at Step S3.

As described above, the mobile phone 1 includes two display units. The mobile phone 1 displays the layout screen 20, which includes the overview of a mail, on one display unit and displays an editor (the text editor 30, the image editor 50) on the other display unit for editing the mail. Therefore, the user can edit the mail while grasping the overview of the mail. Moreover, because the layout screen and the editor are displayed on different screens, i.e., screens that are not overlapped with each other, it is possible to display many predictions, corresponding characters, and available images without obstructing the layout screen 20. With this configuration, the user can select a word or an image while grasping the overview of the image, and the user can edit a mail easily.

Moreover, when an operation is made of moving a text or an image input on the editor toward a screen on which the layout screen 20 is displayed, the input text or the input image is displayed on the layout screen 20 at the destination position: thus, editing is performed so as to add an input text or an input image to a mail. Therefore, it is possible to perform a process of adding a constituent element to a mail while the entire of the layout screen 20 is displayed. With this configuration, the user can edit a mail while grasping the overview of the mail.

The process is explained with reference to FIGS. 3 and 4 of adding a text or an image input on the editor to the layout screen 20. The mobile phone 1 also can edit a text or an image that is on the layout screen. When, for example, an operation of selecting a text to be edited or an image to be edited from the first touch panel 2 is detected (for example, a touch operation or a sweep operation), the mobile phone 1 displays an editor on the second touch panel 3 for editing the selected text or image and performs the same process as that illustrated in FIG. 3 or 4. In this case, it is allowable to update, during editing, the corresponding text or image that is displayed on the layout screen 20 with a resultant of editing by the editor. Moreover, it is possible to move the position of a text or an image that is on the layout screen or change the size thereof. It is allowable to configure the mobile phone 1 to, when, for example, an operation of selecting a text or an image from the first touch panel 2 and moving the selected text or image (for example, a drag operation or a sweep operation) is detected, reduce or increase the size of the selected text or image or move the text or image in accordance with the input operation.

Figure 5:
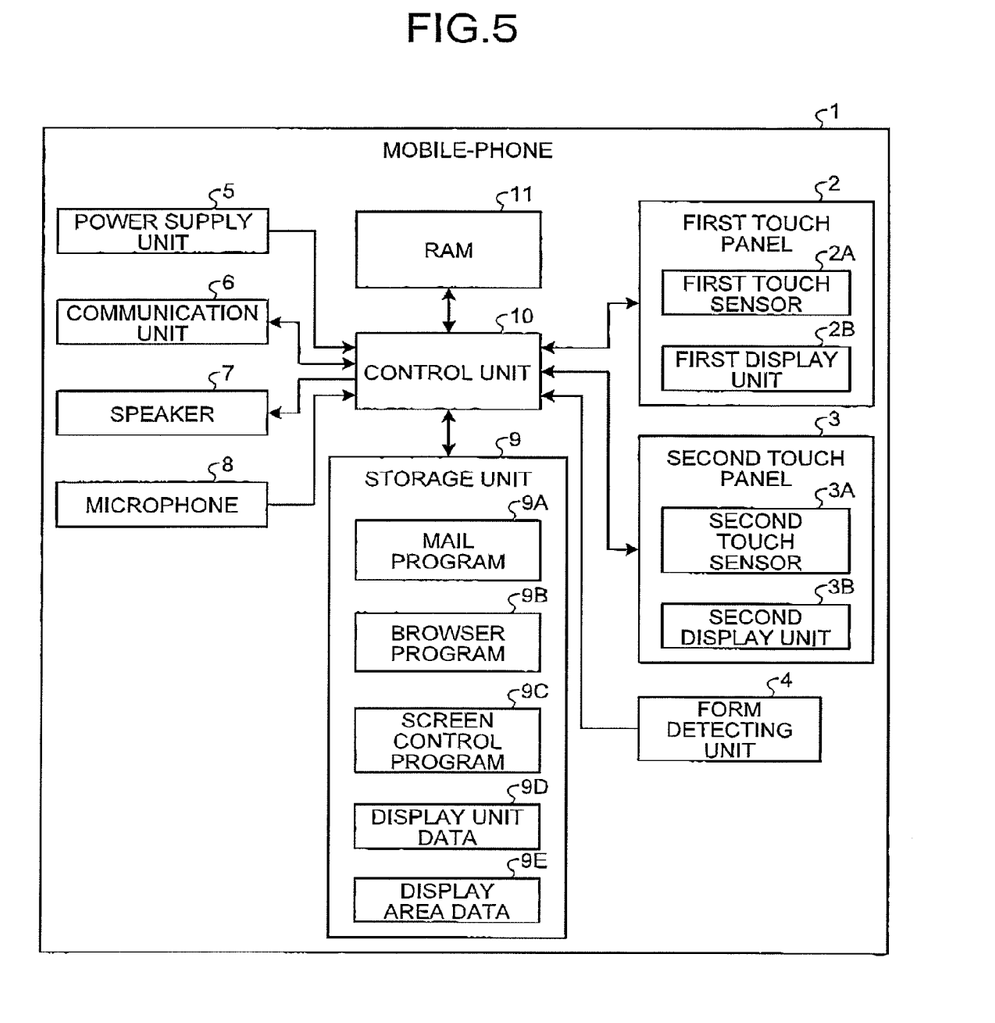
FIG. 5 is a block diagram of t the mobile phone.

The functional configuration of the mobile phone 1 will be explained below with reference to FIG. 5. FIG. 5 is a block diagram of the mobile phone 1. As illustrated in FIG. 5, the mobile phone 1 includes the first touch panel 2, the second touch panel 3, a form detecting unit 4, a power supply unit 5, a communication unit 6, a speaker 7, a microphone 8, a storage unit 9, a control unit 10, and a RAM (Random Access Memory) 11. Almost all the components can be provided on either the first housing 1A or the second housing 1B except that the first touch panel 2 is provided on the first housing 1A and the second touch panel 3 is provided on the second housing 1B.

The first touch panel 2 includes a first display unit 2B and a first touch sensor 2A that overlaps with the first display unit 2B. The second touch panel 3 includes a second display unit 3B and a second touch sensor 3A that overlaps with the second display unit 3B. Each of the first touch sensor 2A and the second touch sensor 3A detects various operations made on the surface with finger(s) as well as the position at which each operation is made. Operations detected by the first touch sensor 2A and the second touch sensor 3A include tap operations, flick operations, drag operations, etc. Each of the first display unit 2B and the second display unit 3B is made with, for example, a liquid crystal display (LCD) or an organic electro-luminescence display (OELD), and displays characters, figures, images, etc., thereon.

The form detecting unit 4 detects whether the mobile phone 1 is in the first form or the second form. For example, the form detecting unit 4 detects the form of the mobile phone 1 by using, for example, a sensor or a mechanical switch that is provided on either surface where the first housing 1A and the second housing 1B face each other.

The power supply unit 5 supplies a power that is received from a battery or an external power source to each functional unit of the mobile phone 1 including the control unit 10. The communication unit 6 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 6. The speaker 7 outputs a voice on the other end of the telephone line, a ringingtone, etc. The microphone 8 converts a voice of the user, etc., into an electrical signal.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.), and stores therein programs and data that are used when the control unit 10 performs processes. More particularly, the storage unit 9 stores therein a mail program 9A that is used to implement an electronic mail function; a browser program 9B that is used to implement a WEB browsing function; a screen control program 9C that is used to implement the above-mentioned screen control; display unit data 9D that includes information about the size and the positional relation between the first display unit 2B and the second display unit 3B, templates of HTML mails (layout appearing at the start of composing), etc.; a display area data 9E that includes information about a display area in which an object is displayed. The storage unit 9 also stores therein various programs and data, such as operating system programs that are used to implement the basic functions of the mobile phone 1, address book data that includes names, phone numbers, mail addresses, etc.

The control unit 10 is, for example, a CPU (Central Processing Unit). The mail control unit 10 integrally controls operations of the mobile phone 1. More particularly, the control unit 10 executes programs stored in the storage unit 9, if necessary, by referring to data stored in the storage unit 9 and controls the first touch panel 2, the communication unit 6, etc., thereby performing various processes. If necessary, the control unit 10 loads programs stored in the storage unit 9 and data acquired/created/processed during a process in a temporary storage region of the RAM 11. It is allowable to download programs to be executed by the control unit 10 and reference data from a server through wireless communications made by the communication unit 6.

For example, the control unit 10 implements the electronic mail function by executing the mail program 9A. The mail program 9A has a function of composing an electronic mail including only a text and a function of composing an HTML mail including a text added with either or both of an image and an animation. Moreover, the control unit 10 implements a function of displaying a screen in accordance with an input operation made by the user in the manner as described above by executing the screen control program 9C.

The procedure of processes performed by the control unit 10 on the basis of the mail program 9A and the screen control program 9C will be explained below with reference to FIGS. 6 to 9. The processes illustrated in FIGS. 6 to 9 are performed when the mail composition function is activated while the mobile phone 1 is in the second form. Each of FIGS. 6 to 9 is a flowchart of operations of the control unit to compose a mail.

Figure 6:
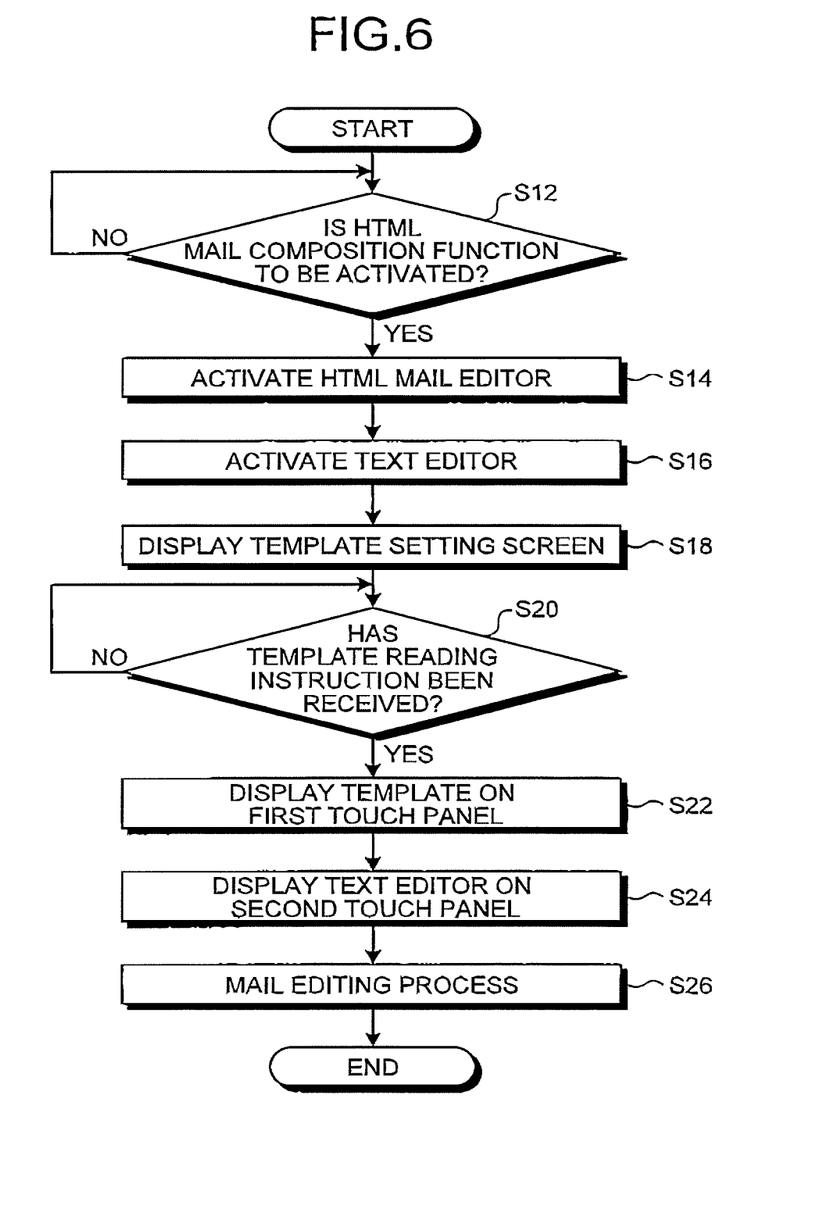
FIG. 6 is a flowchart of operations of the control unit to compose a mail.

The control unit 10 determines at Step S12 whether the HTML mail composition function is to be activated. In other words, the control unit 10 determines whether a mode is selected to compose an HTML mail that includes a text and an image. If the control unit 10 determines at Step S12 that the HTML mail composition function is not to be activated, for example, it is determined that a mail is composed in a mode to compose a text mail (No), the process control goes to Step S12. The process at Step S12 is repeated so that the control unit 10 can perform the switching process immediately when an operation is received to switch from the text mail composition mode to the HTML mail composition mode.

If it is determined at Step S12 that the HTML mail composition function is to be activated (Yes), the control unit 10 activates an HTML mail editor at Step S14 and activates a text editor at Step S16. The HTML mail editor is an editor for editing the layout of the overview of a mail and displays the layout screen 20 as described above. Although, in the present embodiment, the text editor is activated at Step S16 as an initial state, it is allowable to activate an image editor instead.

When the text editor is activated at Step S16, the control unit 10 displays a template setting screen at Step S18. In other words, the control unit 10 displays a certain screen so that the user can select a layout that appears at the start of composing as a basic layout of the content of a mail including an image and a text. The template setting screen is a screen that includes a plurality of size-reduced basic layouts or a screen that enables switching basic layouts sequentially. When the template setting screen is displayed at Step S18, the control unit 10 determines, at Step S20, whether a template reading instruction is received, i.e., whether an instruction is detected to select a certain basic layout.

If the control unit 10 determines at Step S20 that no template reading instruction is received (No), i.e., any basic layout is not selected; the process control goes to Step S20. The control unit 10 repeats the process of Step S20 until a template reading instruction is received.

If it is determined at Step S20 that a template reading instruction is received, i.e., a certain basic layout is selected (Yes), the control unit 10 displays the template, i.e., the selected basic layout on the first touch panel 2 at Step S22, and displays the text editor on the second touch panel 3 at Step S24. When the text editor is displayed on the second touch panel 3 at Step S24, the control unit 10 performs a mail editing process at Step S26. When the control unit completes the mail editing process at Step S26, the present process goes to end.

Figure 7:
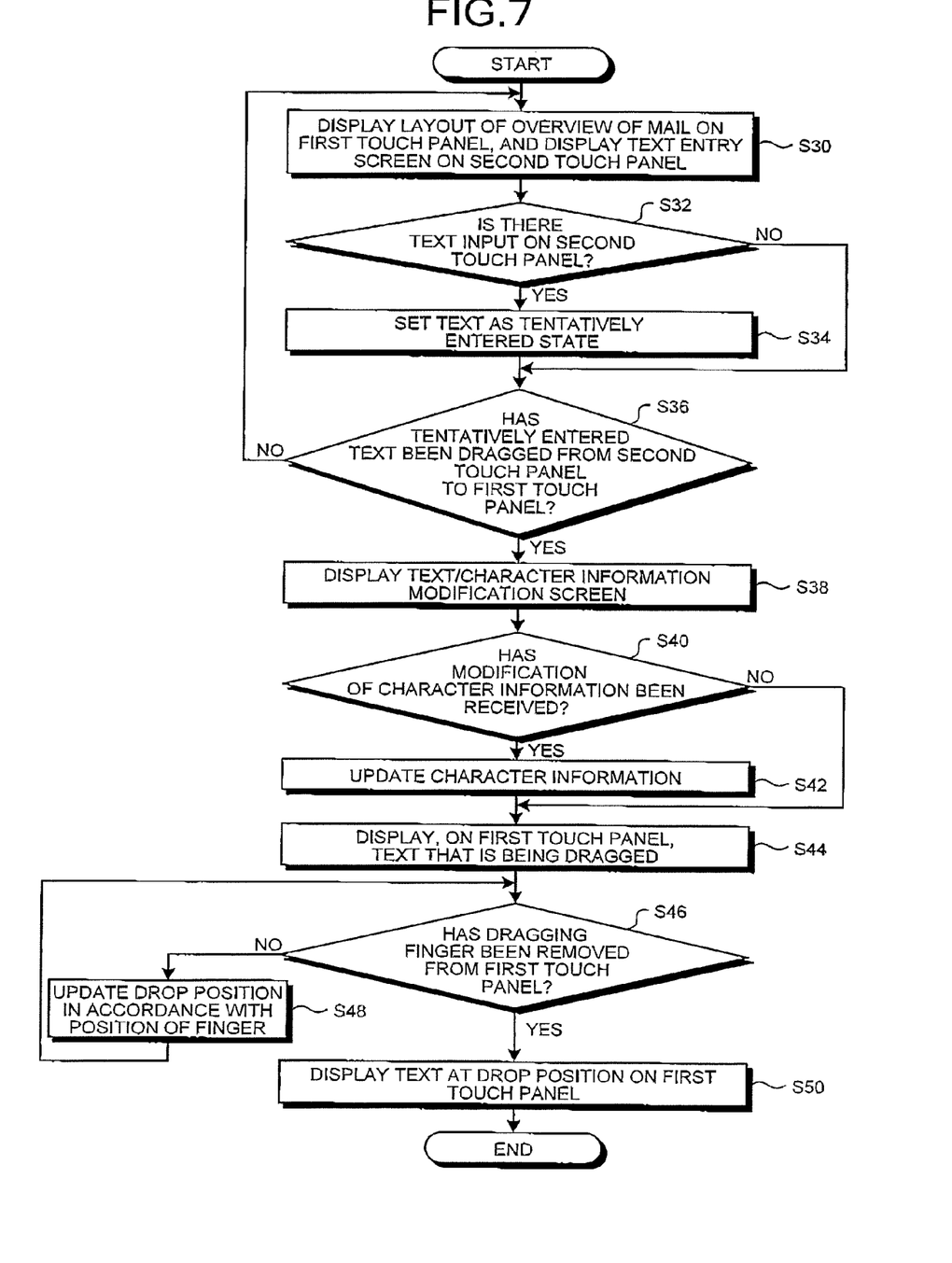
FIG. 7 is a flowchart of operations of the control unit to compose a mail.

An example of the mail editing process will be explained below with reference to FIG. 7. The control unit 10 repeats the process of FIG. 7 until the mail is composed. FIG. 7 illustrates a situation where a text is entered. The same process is also performed when an image is entered.

The control unit 10 displays the layout of the overview of a mail on the first touch panel 2 and a text entry screen (text editor) on the second touch panel 3 at Step S30. When the screens are displayed on the respective touch panels at Step S30, the control unit 10 determines at Step S32 whether there is a text input on the second touch panel. If the control unit 10 determines at Step S32 that there is no input text (No), the process control goes to Step S36.

If it is determined at Step S32 that there is an input text (Yes), the control unit 10 sets the text as tentatively entered (tentatively fixed) state at Step S34. In other words, the control unit 10 detects a character input operation, an enter operation, etc., and then sets, the entered character as tentatively entered state in accordance with the detected operations. When the control unit 10 sets an entered text, i.e., character(s) detected by the text editor and entered as a character input process as tentatively entered state, the process control goes to Step S36.

If the determination at Step S32 is negative or when the process of Step S34 is performed, the control unit 10 determines at Step S36 whether a drag is detected of a tentatively entered text from the second touch panel to the first touch panel. More particularly, it is determined whether a drag operation is detected of dragging the input character display area to the first touch panel. Although, in the present embodiment, a drag operation is detected, it is allowable to assign an operation of moving the input character display area to the first touch panel to other operations than the drag operation.

If the control unit 10 determines at Step S36 that no drag operation is detected (No), the process control goes to Step S30 and the processes from Steps S30 to S36 are repeated. If it is determined at Step S36 that a drag operation is detected (Yes), the control unit 10 displays a text/character information modification screen at Step S38. The text/character information modification screen is a screen with which, when the text of the input character display area is displayed in a layout mode, the user can input an operation for modifying a character information. With the text/character information modification screen, the user can input various operations to modify character information, such as the font format, the color, the size, the display mode (a blinking process, a rotating process, etc.). Moreover, it is possible to modify the settings such that the text is displayed as an animation.

When the text/character information modification screen is displayed at Step S38, the control unit 10 determines at Step S40 whether a modification of character information is received. If the control unit 10 determines that no modification of character information is received (No), the process control goes to Step S44. If it is determined that a modification of character information is received (Yes), the control unit 10 modifies the character information at Step S42. In other words, the character information assigned with the text is updated in accordance with an input operation made on the screen that is displayed at Step S38.

When the process of Step S42 is performed or if the determination at Step S40 is negative, the control unit 10 displays, on the first touch panel 2, the text that is being dragged at Step S44. In other words, the input text is displayed on the layout of the first touch panel 2.

When the text that is being dragged is displayed on the first touch panel 2 at Step S44, the control unit 10 determines at Step S46 whether the dragging finger is removed from the first touch panel. If it is determined at Step S46 that the finger is not removed (No), the control unit 10 updates a drop position in accordance with the position of the finger at Step S48. In other words, the position at which the text is displayed on the layout is updated in accordance with the position of the detected finger. After that, the control unit 10 goes to Step S46.

If it is determined at Step S46 that the finger is removed (Yes), the control unit 10 sets the drop position on the first touch panel 2 as the position at which the text is displayed and displays the text at the set position at Step S50. Thus the present process goes to end.

As described above, because, in the present embodiment, the layout is displayed on the first touch panel and the editor or the editing screen is displayed on the second touch panel, the user can select an element to be added while grasping the overview of the mail. Thereby, the user can edit a mail easily. Moreover, because the selected element is moved onto the layout in accordance with an operation with a moving action, such as a drag operation, it is possible to edit an HTML mail with easy operations.

Figure 8:
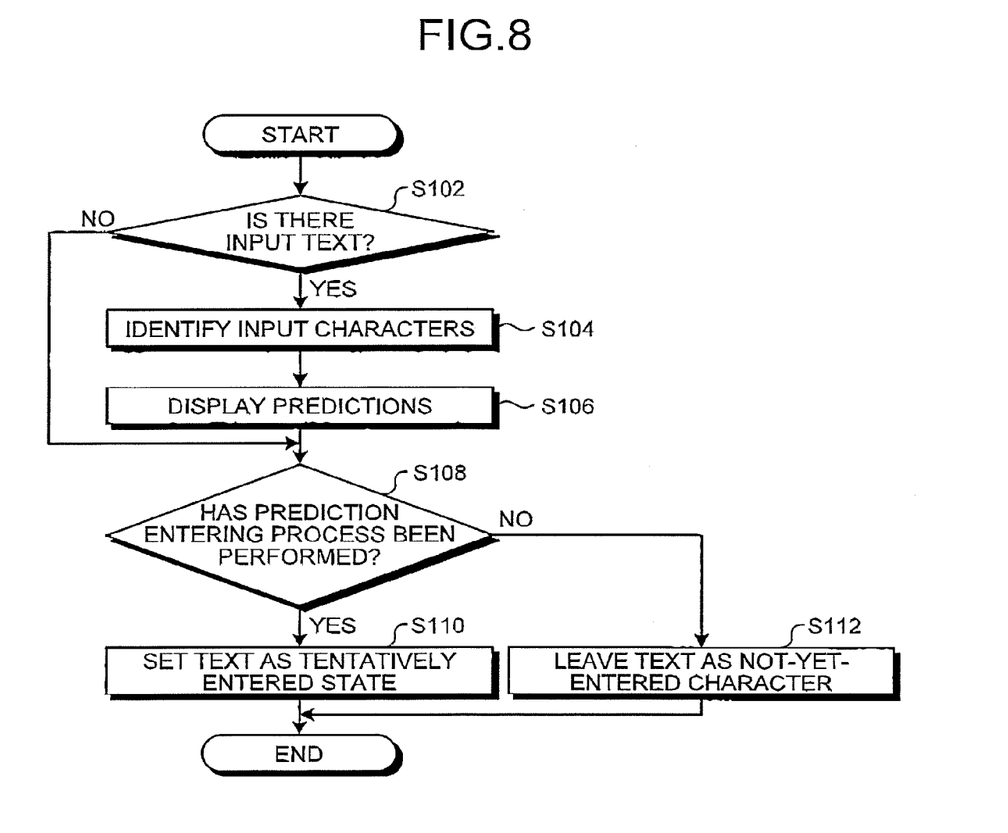
FIG. 8 is a flowchart of operations of the control unit to compose a mail.

Another example of the processes at Steps S32 and S34 of FIG. 7 will be explained below with reference to FIG. 8. The control unit 10 determines at Step S102 whether there is an input text. If the control unit 10 determines at Step S102 that there is no input text (No), the process control goes to Step S108. If it is determined at Step S102 that there is an input text (Yes), the control unit 10 identifies input character(s) at Step S104, and displays predictions in accordance with the identified input character(s) at Step S106.

When the process of Step S106 is performed or if the determination at Step S102 is negative, the control unit 10 determines Step S108 whether a prediction entering process is performed, i.e., whether an operation is made to enter (fix) a prediction that corresponds to the character(s) that is input but not yet converted and thereby the prediction is entered. If it is determined at Step S108 that the entering process is performed (Yes), the control nit 10 sets the entered character as tentatively entered state at Step S110, and the present process goes to end. If it is determined at Step S108 that no entering process is performed (No), the control unit 10 sets character(s) that is input but not yet converted as a character that is not yet entered at Step S112, and thus the present process goes to end. Various processes other than the above processes can be used as a method of inputting a text and a method of entering character(s).

Another example of the processes at Step S46 and the subsequent steps of FIG. 7 will be explained below with reference to FIG. 9. The control unit 10 displays, on the first touch panel 2, the text that is being dragged at Step S120, and determines whether the dragging finger is removed from the first touch panel at Step S124. If it is determined at Step S124 that the finger is not removed (No), the control unit 10 updates a drop position in accordance with the position of the finger at Step S126. In other words, the position at which the text is displayed on the layout is updated in accordance with the position of the detected finger. After that, the control unit 10 goes to Step S120.

If it is determined at Step S126 that the finger is removed (Yes), the control unit 10 determines at Step S128 whether it is possible to insert text in this position. In other words, it is determined whether the drop position is a text displayable region within the layout. If it is determined at Step S128 that it is not possible to insert text in this position (No), i.e., text insertion is impossible, the control unit 10 displays a warning to change the position at Step S130. When the warning is displayed at Step S130, the control unit 10 determines whether a drag operation is detected at Step S132. In other words, it is determined whether an input operation is made again to drag a target text. If the control unit 10 determines at Step S132 that a drag operation is detected (Yes), the process control goes to Step S120 and the above processes are repeated.

If it is determined at Step S132 that no drag operation is detected (No), the control unit 10 determined at Step S134 whether a predetermined time has been elapsed, more specifically, a set time has bee elapsed since the warning is displayed. If the control unit 10 determines at Step S134 that a predetermined time has not been elapsed yet (No), the process control goes to Step S132. In contrast, if it is determined at Step S134 that a predetermined time has been elapsed (Yes), the control unit 10 performs an error process, more specifically, a process of invalidating the text dragging operation at Step S136, and thus the preset process goes to end.

If it is determined at Step S128 that it is possible to insert text this position (Yes), the control unit 10 detects the coordinates of the drop position on the first touch panel 2 at Step S140, and then pastes the text at the position indicated by the coordinate information on the first touch panel 2, i.e., the drop position detected at Step S140, at Step S142. More particularly, the control unit 10 acquires information (positional information) indicative of the coordinates of the drop position to which a text (an edited content) is moved from the second touch panel 3 to the first touch panel 2, and sets the information indicative of the destination position on the layout in a tag (a attribute information) corresponding to the text (the edited content). The control unit 10 pastes the text in the layout in accordance with the positional information set in the tag. When the control unit 10 pastes the text, the present process goes to end. If the dragged text is assigned with user specified character information, such as the font size, the color, and the display mode (a blinking process, a rotating process, etc.,), the control unit 10 add these pieces of the character information to the tag.

Figure 9:
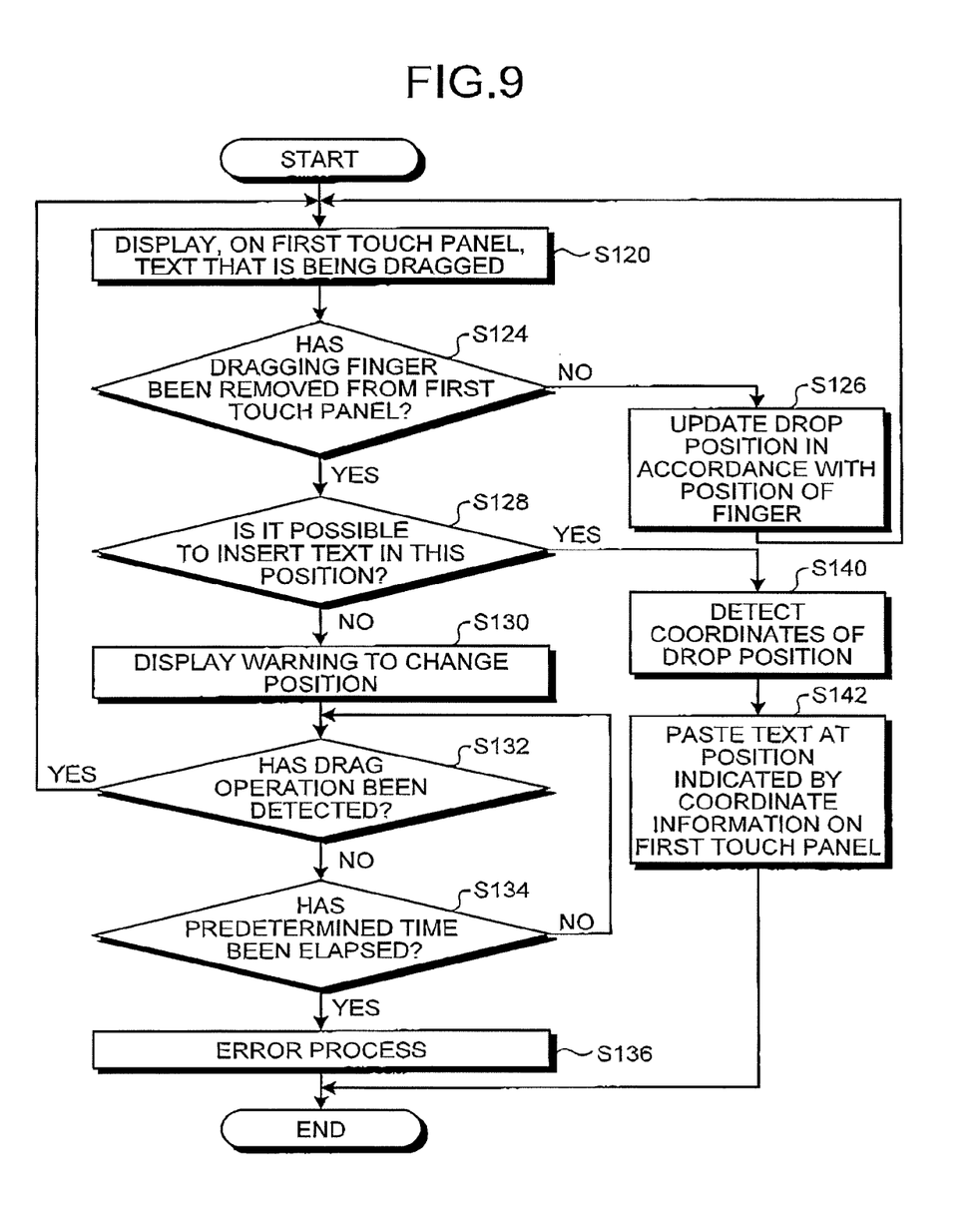
FIG. 9 is a flowchart of operations of the control unit to compose a mail.

As illustrated in FIG. 9, when the paste position is not proper, the mobile phone 1 does not paste the text; therefore, the possibility is reduced that a layout impossible for an HTML mail is composed.

With the above embodiment, when a text is added (pasted) onto the layout, the mobile phone 1 associates information about the region with the text and displays the text on the region. If there are two or more texts, the positions are set such that the texts are displayed in the respective regions. The configuration is not limited thereto. The mobile phone 1 can adjust the position by adding a space or a tab (tab character) in accordance with the position of a text to be added to the layout or by adding an indent so that the text is displayed at the set position. More particularly, if the content of the edition is a text editing operation and if the position rule that is set to the destination on the layout of the first touch panel 2 is left-alignment, the control unit 10 can insert the text to the layout of the first touch panel 2 at the destination position by adjusting spaces or tabs that are inserted to the left of the text to be added or by adding an indent such that the offset position goes right several character spaces. With this configuration, added texts are managed integrally with one region. Moreover, because the position of a text is adjusted by using spaces, tabs, and intents, it is unnecessary to assign a region to each text. This enables a reduction in the amount of data in a mail.

Although, in the above embodiment, an HTML mail is used as an example of a mail made up with an image and a text, any other mails are available. The mobile phone 1 can use the above processing method to compose various types of mails made up with an image and a text.

Various modifications can be made to the above embodiments of the present invention without departing from the scope of the present invention. For example, the screen control program 9C can be separated into a plurality of modules or can be integrated with another program.

Although an electronic device of the above embodiment that has two display units is used as an example of the electronic device, the present invention can be applied to an electronic device that has three or more display units. When a screen is displayed on two or more display units of an electronic device that has three or more display units, the screen can be displayed over all the display units or over some display units selected in advance. Although the above embodiment is explained with two display units, it is allowable to display two screens (the layout and the editor) on the same display unit such that the screens do not overlap with each other.

The advantages are that one embodiment of the invention provides an electronic device, a screen control method and a screen control program that allow the user to compose a mail while grasping an overview of the contents of the composed mail.

What is claimed is:

1. An electronic device for composing a mail that includes an image and a text, the electronic device comprising:
    a display unit for displaying a first screen for displaying an overview of the mail and a second screen for editing an image or a text as an element to be added to the mail, in such a manner that the first screen and the second screen do not overlap each other, wherein the second screen comprises:
        a virtual keyboard for entering the element when the element is a text, or an image editor for entering the element when the element is an image, and
        an input display area in which the entered element is displayed;
    a touch detecting unit for detecting a contact made with the first screen or the second screen as an operation; and
    a control unit for updating, when an operation with a touch maintained on the entered element in the input display area of the second screen, followed by a moving action toward the first screen is detected by the touch detecting unit, the overview of the mail that is displayed on the first screen in accordance with the operation,
    wherein the control unit is configured to insert, when the touch detecting unit detects an operation to move the element edited in the second screen to the first screen, the element into the first screen,
    wherein, when the touch detecting unit detects a touch maintained on the first screen as the operation, the control unit is configured to insert the element into the first screen at a position where the maintained touch is detected on the first screen, and
    wherein the control unit is configured to insert, when the element is a text and an alignment rule is applied to the position, the element into the first screen at the position accompanied with a space or tab character to comply with the alignment rule.

2. The electronic device according to claim 1, wherein the mail is an HTML mail, and
    the control unit is configured to set the position in a tag corresponding to the element.

3. The electronic device according to claim 2, wherein the control unit is configured to further set specified character information in the tag.

4. The electronic device according to claim 1, wherein the display unit includes a first display unit for displaying thereon the first screen and a second display unit for displaying thereon the second screen.

5. The electronic device according to claim 4, further comprising:
    a first housing on which the first display unit is arranged; and
    a second housing on which the second display unit is arranged.

6. A screen control method executed by an electronic device for composing a mail that includes an image and a text, the screen control method comprising:
    displaying a first screen for displaying an overview of the mail;
    displaying a second screen for editing an image or a text as an element to be added to the mail, in such a manner that the first screen and the second screen do not overlap each other, wherein the second screen comprises:
        a virtual keyboard for entering the element when the element is a text, or an image editor for entering the element when the element is an image, and
        an input display area in which the entered element is displayed;
    detecting, by a touch detecting unit, an operation with a touch maintained on the entered element in the input display area of the second screen, followed by a moving action toward the first screen; and
    updating the overview of the mail that is displayed on the first screen in accordance with the operation,
    wherein the element is inserted into the first screen when the touch detecting unit detects an operation to move the element edited in the second screen to the first screen,
    wherein, when the touch detecting unit detects a touch maintained on the first screen as the operation, the element is inserted into the first screen at a position where the maintained touch is detected on the first screen, and
    wherein, when the element is a text and an alignment rule is applied to the position, the element is inserted into the first screen at the position accompanied with a space or tab character to comply with the alignment rule.

7. A non-transitory storage medium that stores a screen control program for causing, when executed by an electronic device for composing a mail that includes an image and a text, the electronic device to execute
    displaying a first screen for displaying an overview of the mail;
    displaying a second screen for editing an image or a text as an element to be added to the mail, in such a manner that the first screen and the second screen do not overlap each other, wherein the second screen comprises:
        a virtual keyboard for entering the element when the element is a text, or an image editor for entering the element when the element is an image, and
        an input display area in which the entered element is displayed;
    detecting, by a touch detecting unit, an operation with a touch maintained on the entered element in the input display area of the second screen, followed by a moving action toward the first screen; and
    updating the overview of the mail that is displayed on the first screen in accordance with the operation,
    wherein the element is inserted into the first screen when the touch detecting unit detects an operation to move the element edited in the second screen to the first screen,
    wherein, when the touch detecting unit detects a touch maintained on the first screen as the operation, the element is inserted into the first screen at a position where the maintained touch is detected on the first screen, and
    wherein, when the element is a text and an alignment rule is applied to the position, the element is inserted into the first screen at the position accompanied with a space or tab character to comply with the alignment rule.

8. The electronic device according to claim 1, wherein the display unit further includes an area between the first screen and the second screen, and
    the touch detecting unit is configured not to detect an operation directly applied in the area but the touch detecting unit is configured to detect an operation of moving the element from the second screen across the area to the first screen.

\* \* \* \* \*